(12) United States Patent
Otani

(10) Patent No.: US 8,767,406 B2
(45) Date of Patent: Jul. 1, 2014

(54) ELECTRONIC DEVICE

(75) Inventor: Masayuki Otani, Daito (JP)

(73) Assignee: KYOCERA Corporation, Kyoto (JP)

( * ) Notice: Subject to any disclaimer, the term of this patent is extended or adjusted under 35 U.S.C. 154(b) by 313 days.

(21) Appl. No.: 13/146,628

(22) PCT Filed: Jan. 22, 2010

(86) PCT No.: PCT/JP2010/000373
§ 371 (c)(1),
(2), (4) Date: Jul. 27, 2011

(87) PCT Pub. No.: WO2010/087141
PCT Pub. Date: Aug. 5, 2010

(65) Prior Publication Data
US 2011/0279987 A1 Nov. 17, 2011

(30) Foreign Application Priority Data
Jan. 28, 2009 (JP) .................................. 2009-016730

(51) Int. Cl.
*H05K 5/00* (2006.01)
*H05K 5/04* (2006.01)
*H05K 5/06* (2006.01)

(52) U.S. Cl.
USPC ........... 361/752; 361/753; 361/807; 361/810; 361/814

(58) Field of Classification Search
USPC .......... 361/752–753, 807–810, 814; 439/571, 439/108; 455/90.3
See application file for complete search history.

(56) References Cited

U.S. PATENT DOCUMENTS

| | | | |
|---|---|---|---|
| 5,919,052 A * | 7/1999 | Ho | ................................. 439/83 |
| 6,111,760 A | 8/2000 | Nixon | |
| 2004/0203515 A1* | 10/2004 | Kuriyama | ..................... 455/90.3 |
| 2007/0004275 A1* | 1/2007 | Li et al. | ......................... 439/573 |
| 2007/0093106 A1* | 4/2007 | Lu et al. | ........................ 439/188 |

FOREIGN PATENT DOCUMENTS

| | | |
|---|---|---|
| JP | H10-284855 A | 10/1998 |
| JP | 2000-295133 A | 10/2000 |
| JP | 2002-534814 A | 10/2002 |
| JP | 2006-162738 A | 6/2006 |
| JP | 2007-216836 A | 8/2007 |
| JP | 2008-072616 A | 3/2008 |

OTHER PUBLICATIONS

International Search Report dated Feb. 16, 2010 issued by the Japanese Patent Office for International Application No. PCT/JP2010-000373.

* cited by examiner

*Primary Examiner* — Tuan T Dinh
(74) *Attorney, Agent, or Firm* — Procopio, Cory, Hargreaves & Savitch LLP

(57) ABSTRACT

A mobile phone that is an electronic device includes a bottom housing including a first bottom subhousing. On the first bottom subhousing a rib is provided so as to surround a position where an earphone jack is to be provided and be in with a substrate on which the earphone jack is to be provided. This rib prevents liquid from infiltrating into the bottom housing. Connection terminals of the earphone jack are each connected with other components of the mobile phone such as a CPU via an inner layer of the substrate.

9 Claims, 5 Drawing Sheets

ELECTRONIC DEVICE

TECHNICAL FIELD

The present invention relates to an electronic device, and particularly to a waterproof art for use in an electronic device whose housing has an opening.

BACKGROUND ART

Since an electronic device such as a mobile phone is provided with an interface unit such as an earphone jack and a USB terminal for connection to an external device, and accordingly has an opening from which a connection terminal is exposed is provided in its housing. The provision of the opening means possible infiltration of a material such as liquid and dust via the opening, which is harmful to components inside the housing of the electronic device.

For example, liquid infiltration via the opening might cause some troubles in circuits inside the electronic device.

In response, a conventional art discloses a method of covering such an opening with a rubber cover or the like, so as to prevent liquid and dust from infiltrating via the opening while an earphone or a USB cable is not connected.

Also, another conventional art discloses a method of attaching a waterproof sheet around an earphone jack so as to prevent a material, which has infiltrated via an opening such as liquid and dust, from further infiltrating into other components provided on a substrate. According to this conventional art, attachment of a sheet covering the earphone jack prevents inflow of such a material via the earphone jack.

SUMMARY OF INVENTION

Technical Problem

However, provision of a cover or a waterproof sheet according to the above conventional arts undeniably leads to the increase in the costs for the provision and the increase in the number of manufacturing processes. Also, even if an earphone jack is manufactured so as to have an insertion slot which is covered, it is inevitable that the designing needs to be drastically changed and the number of manufacturing processes increases.

In view of this problem, the present invention aims to provide an electronic device capable of reducing an influence of liquid infiltration via an opening of an interface unit on components inside a housing of the electronic device, without using a cover and a waterproof sheet such as described above.

Solution to Problem

In order to solve the above problem, the present invention provides an electronic device comprising: a housing; a substrate provided in the housing; and an interface unit provided on the substrate, wherein the housing includes: an opening from which the interface unit is exposed; and a partitioning part that extends from the opening so as to surround the interface unit.

Also, the substrate may be a multilayer substrate, and the interface unit may be connected with other components of the electronic device via a connection wire that passes through an inner layer of the substrate.

Also, the partitioning part may include a supporting subpart that extends toward the interface unit.

Also, the interface unit may be an earphone jack.

Also, the interface unit may be a USB terminal.

DESCRIPTION OF EMBODIMENTS

The following describes a mobile phone as an embodiment of an electronic device relating to the present invention, with reference to the drawings.

Figure 1:
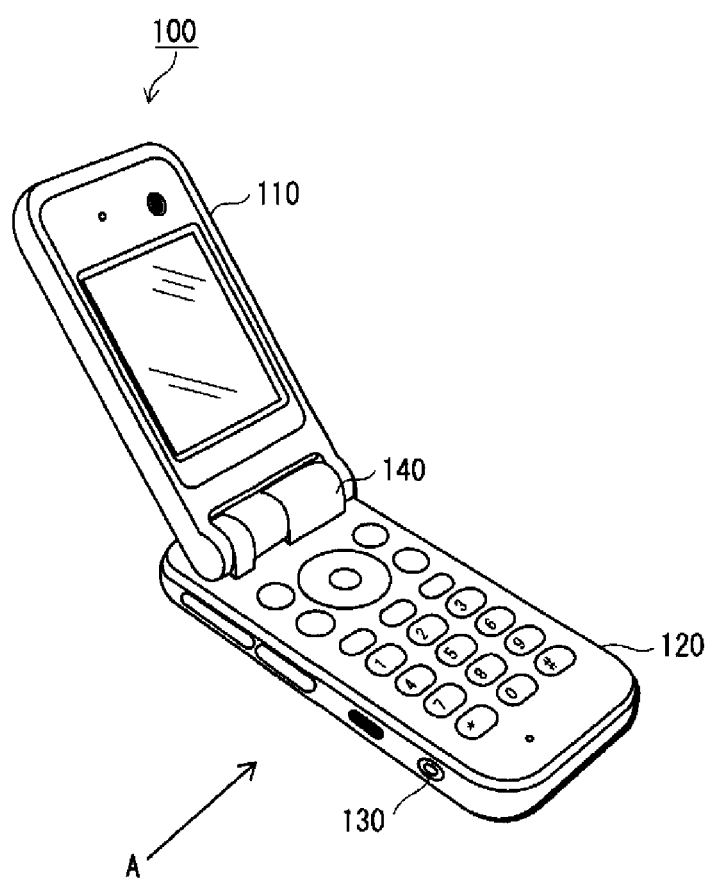
FIG. 1 shows an external appearance of a mobile phone 100.

FIG. 1 shows an external appearance of a mobile phone 100.

The mobile phone 100 is composed of a top housing 110 and a bottom housing 120 that are connected to each other via a hinge 140, as shown in FIG. 1. Also, the bottom housing 120 has an opening 150 from which an earphone jack 130 is exposed. When an earphone plug (not shown) is inserted into the earphone jack 130, audio is output from an earphone. This earphone jack 130 is a round-type one. Unlike conventional mobile phones, the opening 150 of the mobile phone 100 from which the earphone jack 130 is exposed is not covered with a rubber cover. Of course, the present invention is also applicable to an electronic device such as a mobile phone provided with such a cover.

Figure 2:
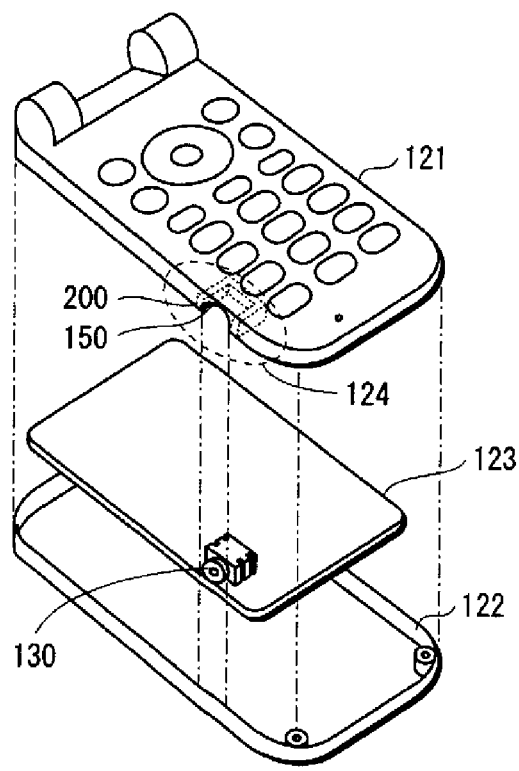
FIG. 2 is an exploded view of a bottom housing 120.

FIG. 2 is a simplified exploded perspective view of the bottom housing 120. The bottom housing 120 is composed of a resin first bottom subhousing 121, a resin second bottom subhousing 122, and a substrate 123 that is sandwiched between the first bottom subhousing 121 and the second bottom subhousing 122. Note that although FIG. 2 shows only the earphone jack 130 is provided on the substrate 123, other components are actually provided on the substrate 123, such as a CPU, a capacitor, and a resistor. Also, FIG. 2 does not show components such as a battery provided in parts other than on the substrate 123.

The earphone jack 130 is provided on the substrate 123. A rib 200 is provided so as to surround the earphone jack 130 together with the first bottom subhousing 121 when the earphone jack 130 is sandwiched between the first bottom subhousing 121 and the second bottom subhousing 122. When a material such as liquid infiltrates into the bottom housing via the earphone jack 130, the rib 200 functions as a partition for preventing such a material from infiltrating into further inside of the bottom housing. Here, the earphone jack 130 is a ready-made product having an inlet.

Figure 3:
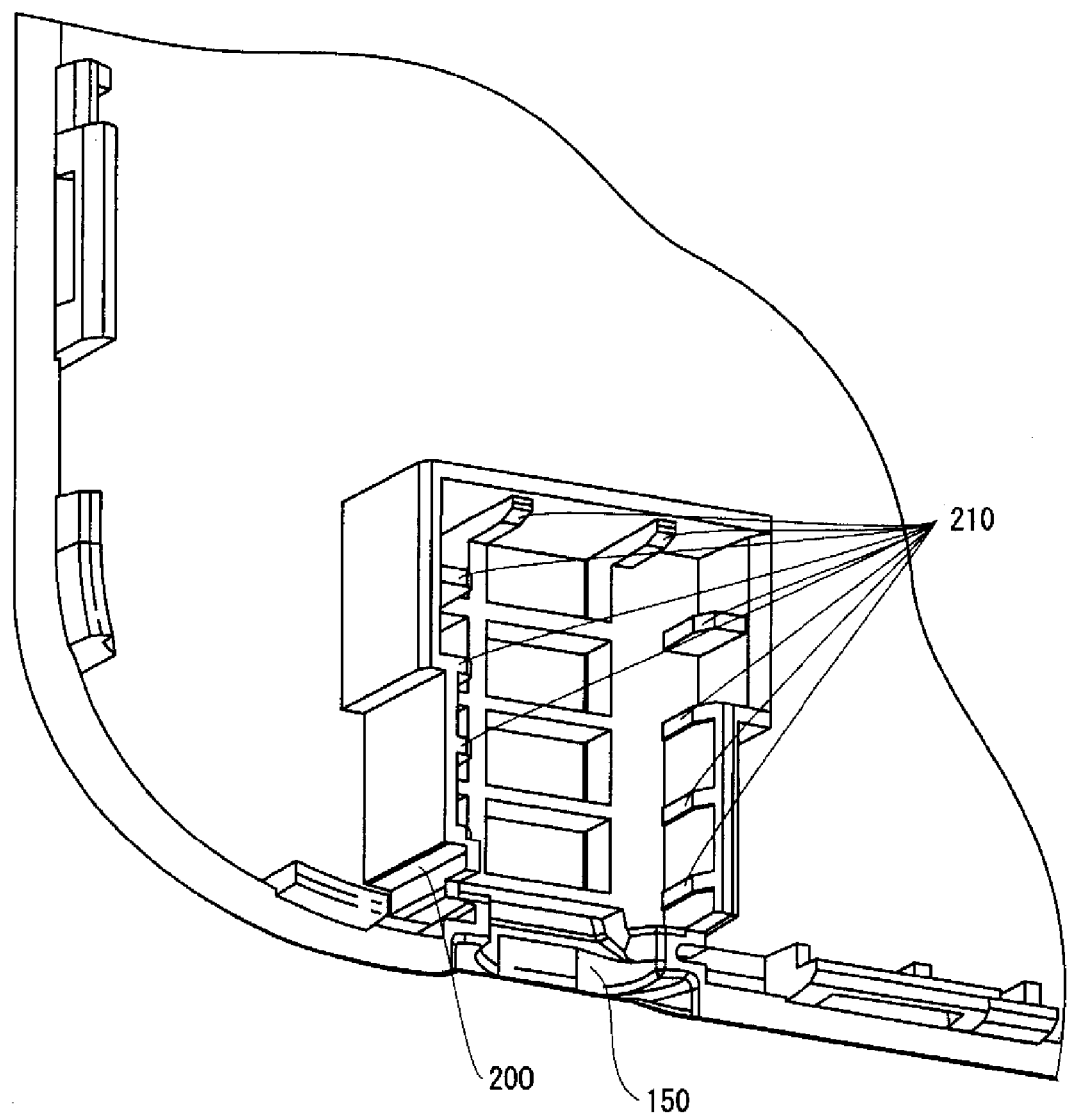
FIG. 3 is an enlarged view of a rib periphery 124.
Figure 4:
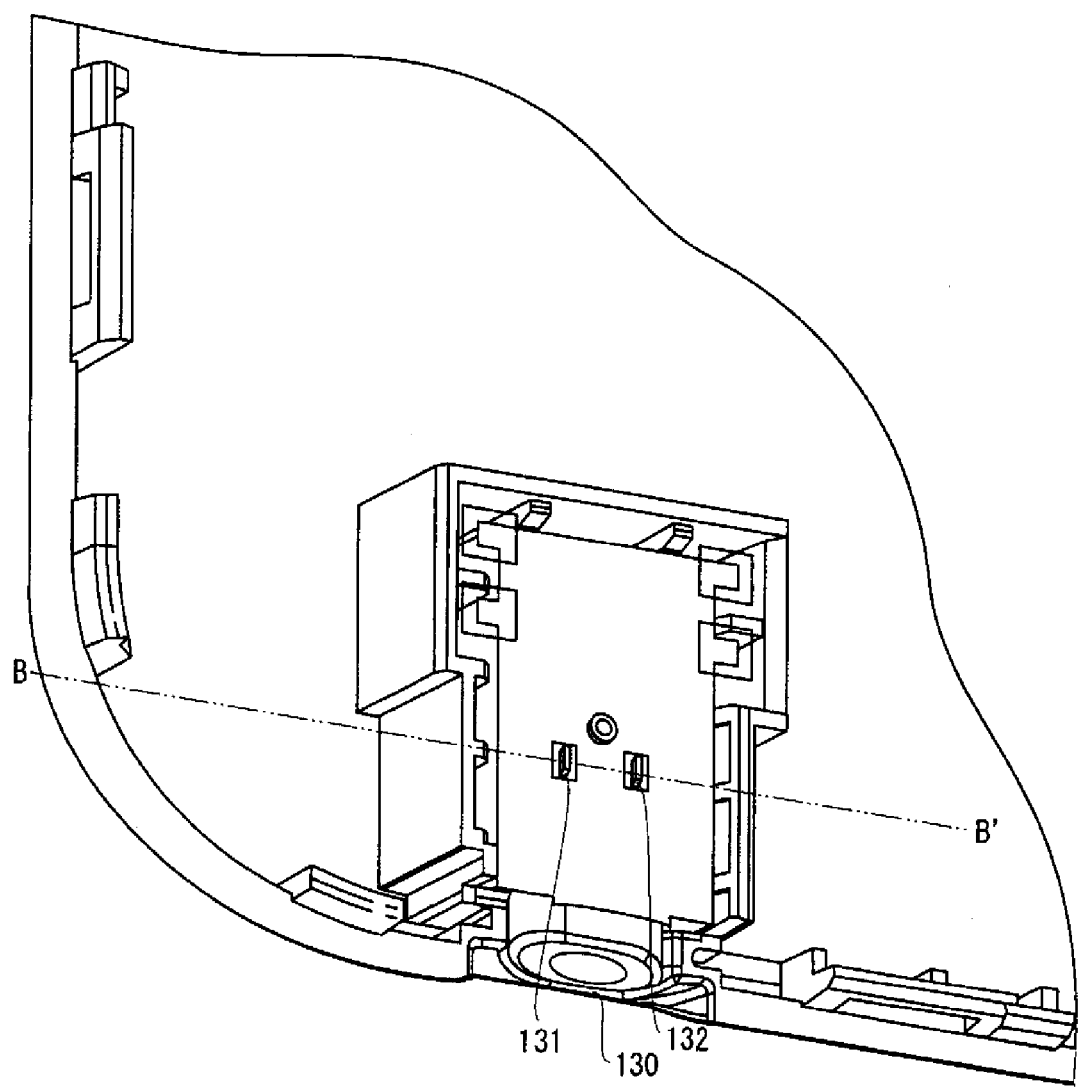
FIG. 4 is an enlarged view of the rib periphery 123 shown in FIG. 3 in which a earphone jack is provided.
Figure 5:
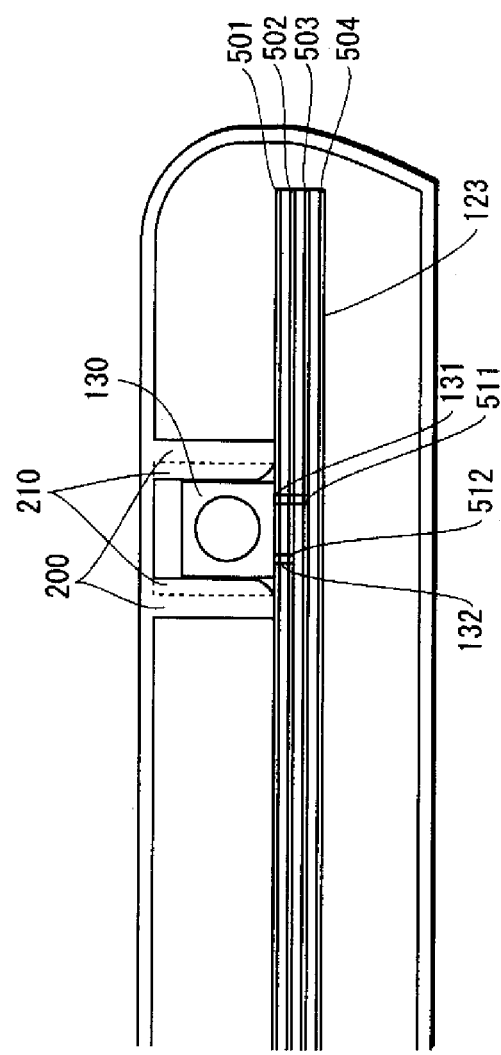
FIG. 5 is a cross-sectional view of the bottom housing 120.

The following describes the rib 200 in further detail, with reference to FIG. 3 to FIG. 5.

FIG. 3 and FIG. 4 are each an enlarged view of a rib periphery 124 of the first bottom subhousing 121 shown in FIG. 2, seen from the back. FIG. 3 shows the rib periphery 124 where the earphone jack 130 has not yet been provided. FIG. 4 shows the rib periphery 124 where the earphone jack 130 is provided. Also, FIG. 5 is a cross-sectional view of the rib periphery 124 along a line B-B' shown in FIG. 4, when the mobile phone 100 is seen in a direction indicated by an arrow A shown in FIG. 1.

As can be seen from FIG. 3 and FIG. 4, in the first bottom subhousing 121 of the mobile phone 100 as an embodiment of the electronic device relating to the present invention, the rib 200 is provided so as to surround a position where the earphone jack 130 is to be provided.

A rib is originally intended for increasing the rigidity of a housing. According to the present invention, the first bottom subhousing 121 is designed such that the rib 200 surrounds the position where earphone jack 130 is to be provided. The processes of manufacturing the mobile phone 100 originally includes designing of an outer shape of the mobile phone 100. Accordingly, provision of the rib 200 in the housing does not increase the number of manufacturing processes, the manufacturing costs, and so on.

The rib 200 extends so as to be in contact with the substrate 123, as shown in the cross-sectional view of FIG. 5.

As shown in FIG. 4, the earphone jack 130 includes connection terminals 131 and 132 that are each connected to the substrate 123. More specifically, as shown in FIG. 5, the substrate 123 is a multilayer substrate composed of a first layer 501, a second layer 502, a third layer 503, and a fourth layer 504. The connection terminal 131 of the earphone jack 130 is connected to the second layer 502 through a via 511 so as to be connected to other components. Also, the connection terminal 132 of the earphone jack 130 is connected to the third layer 503 through a via 512 so as to be connected to other components. The earphone jack 130 is connected to other components through an inner layer constituting the substrate 123. This makes unnecessary to form a connection wire on the surface of the substrate 123 for connecting the earphone jack 130 to other components, thereby avoiding occurrence of short, which is caused by liquid infiltrates in the case where the connection wire is provided on the surface of the substrate 123. As a result, the reliability of the mobile phone 100 can be further improved.

Also, as can be seen from FIG. 3 to FIG. 5, the rib 200 includes subribs 210 that each extend toward the earphone jack 130 and extend substantially vertically from the rib 200 so as to be substantially in contact with the earphone jack 130. With this structure, even when a user tries to roughly insert or eject the earphone plug into or from the earphone jack 130, the earphone jack 130 is less likely to become loose. Accordingly, it is possible to prevent the connection terminals 131 and 132 of the earphone jack 130 from detaching from the substrate 123 as much as possible.

According to the mobile phone 100 as described above, the rib 200 is provided in the housing so as to surround the earphone jack 130. Accordingly, even when a material such as liquid infiltrates via the earphone jack 130, which might cause abnormality in internal circuits of the mobile phone 100, such a material does not further infiltrate from the periphery of the earphone jack 130 into other area on the substrate 123. This exhibits an effect such as the reduction in the cost of a conventionally provided rubber cover and the number of manufacturing processes.

With the above structure, even when a material such as liquid infiltrates into the housing via the opening of the interface unit such as an earphone jack, the partitioning part can prevent such a material from further infiltrating to other components inside the housing. Since the process of manufacturing an electronic device originally includes designing of the shape of its housing, it is only necessary to design the shape of the housing such that the partitioning part surrounds the interface unit. This cause neither special increase in the costs nor increase in the number of manufacturing processes. As a result, it is possible to realize an electronic device capable of reducing the influence of liquid infiltration via the interface unit that exercises on components inside the housing.

Supplementary Explanation

Although the method of implementing the present invention has been described in the above embodiment, the implement method of the present invention is not limited to this. The following describes modification examples of present invention.

(1) In the above embodiment, the earphone jack 130 is used as an example of an interface unit including a connection terminal for connection to an external device. Alternatively, any type of interface unit may be employed, as long as a connection terminal for connection to an external device is included and accordingly an opening is provided in a housing. For example, it may be possible to employ a USB terminal, an SD card connection terminal, and a charging terminal as an interface unit.

Also, in the above embodiment, the earphone jack 130 is a round-type one. Alternatively, a flat-type earphone jack may be employed.

(2) In the above embodiment, the substrate 123 is a four-layer substrate. Alternatively, the substrate 123 may be composed of any number of layers. For example, the substrate 123 may be a seven-layer substrate.

Further alternatively, the substrate 123 may be a single-layer substrate, that is, may not be a multilayer substrate. Note that, in this case, a connection wire needs to be provided on the surface of the substrate 123 to connect the earphone jack 130 to other components.

(3) In the above embodiment, the ribs, which each extend substantially vertically from the rib 200, are referred to as the sub ribs 210 for convenience of distinction from the rib 200. Generally, these sub ribs 210 are each also referred to as a rib.

(4) In the above embodiment, the rib 200 extends so as to be in contact with the substrate 123.

Note that the end of the extended rib 200 may be bonded to the substrate 123 so as to be adhered tightly to the substrate 123. On the other hand, in the case where it is only necessary to exhibit a waterproof effect of the minimal prevention of liquid infiltration, the end of the rib 200 does not necessarily need to be completely adhered to the substrate 123, and some gaps may remain therebetween.

(5) In the above embodiment, a mobile phone is used as an example of the electronic device relating to the present invention. Alternatively, any type of electronic device may be employed, as long as a connection terminal such as an earphone jack for connection to an external device is included and accordingly an opening for exposing the connection terminal is provided in a housing. For example, an PDA (Personal Digital Assistants) may be employed as an electronic device.

(6) In the above embodiment, the rib 200 includes subribs 210 that each extend substantially vertically from the rib 200. Alternatively, the subribs 210 may be each provided at any angle with respect to the rib 200, which is appropriate depending on the designing.

INDUSTRIAL APPLICABILITY

The electronic device relating to the present invention is usable as an electronic device, which has a connection terminal for connection to an external device, capable of reducing, without using a cover or the like, an influence that liquid infiltration into the inside of the electronic device has on internal circuits.

REFERENCE SIGNS LIST

100: mobile phone
110: top housing
120: bottom housing
121: first bottom subhousing 122: second bottom subhousing
123: substrate
130: earphone jack (interface unit)
131 and 132: connection terminal
140: hinge
150: opening
200: rib (partitioning part)
210: subrib (supporting part)

The invention claimed is:

1. An electronic device comprising:
   a substrate;
   and an interface unit provided on the substrate; and,
   a housing including an opening and a partitioning part, the partitioning part extending to the substrate, and the partitioning part further extending from the opening around the interface unit such that the interface unit is surrounded by the partitioning part from the opening and the interface unit is exposed at the opening;
   wherein the partitioning part is a rib provisioned in the housing, the rib is in contact with the substrate, and bonded to the substrate.

2. The electronic device of claim 1, wherein the partitioning part includes a supporting subpart that extends toward the interface unit.

3. The electronic device of claim 1, wherein the interface unit is an earphone jack.

4. The electronic device of claim 1, wherein the interface unit is a USB terminal.

5. The electronic device of claim 1, wherein the interface unit is an SD card connection terminal.

6. The electronic device of claim 1, wherein the interface unit is a charging terminal.

7. The electronic device of claim 1, wherein the partitioning part is configured to prevent a material from infiltrating from the opening into the housing past the partitioning part.

8. The electronic device of claim 1, wherein the substrate includes at least one electrical connection with other components of the electronic device; and
   wherein the interface unit is electrically coupled to the at least one electrical connection of the substrate.

9. The electronic device of claim 8, wherein the substrate is a multilayer substrate, and the at least one electrical connection includes a via that passes through an inner layer of the substrate.

* * * * *